(12) United States Patent
Highstrom et al.

(10) Patent No.: US 8,825,115 B2
(45) Date of Patent: Sep. 2, 2014

(54) HANDOFF FROM PUBLIC TO PRIVATE MODE FOR COMMUNICATIONS

(75) Inventors: Matthew M. Highstrom, Highland, MI (US); Andrew W. Gellatly, Macomb, MI (US); Cody R. Hansen, Shelby Township, MI (US); David P. Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 12/713,288

(22) Filed: Feb. 26, 2010

(65) Prior Publication Data

US 2011/0212748 A1 Sep. 1, 2011

(51) Int. Cl.
*H04M 1/00* (2006.01)

(52) U.S. Cl.
USPC ...................................................... 455/569.2

(58) Field of Classification Search
USPC ...................... 455/99, 569.1, 569.2
See application file for complete search history.

(56) References Cited

U.S. PATENT DOCUMENTS

| 8,244,307 | B1* | 8/2012 | Tilgner et al. | ............. 455/569.1 |
|---|---|---|---|---|
| 2004/0102227 | A1 | 5/2004 | Schlegel | |
| 2004/0162026 | A1* | 8/2004 | Hong | ............. 455/41.2 |
| 2005/0096099 | A1* | 5/2005 | Barclay et al. | ............. 455/569.2 |
| 2005/0239479 | A1* | 10/2005 | Bednasz | ............. 455/456.1 |
| 2007/0140187 | A1* | 6/2007 | Rokusek et al. | ............. 370/338 |
| 2008/0146206 | A1 | 6/2008 | Pichardo et al. | |
| 2008/0319653 | A1* | 12/2008 | Moshfeghi | ............. 701/208 |

FOREIGN PATENT DOCUMENTS

| DE | 10103609 A1 | 8/2002 |
|---|---|---|
| WO | 2005029826 A1 | 3/2005 |

* cited by examiner

*Primary Examiner* — Joel Ajayi

(74) *Attorney, Agent, or Firm* — Cantor Colburn LLP

(57) ABSTRACT

An automobile communication system includes an outgoing communication controller that receives a communication from a first input source in a first operating mode and a second input source in a second operating mode. The system also includes an input selector that selects the first input source in the first mode and the second input source in the second mode and a mode selector operable by an automobile passenger that determines the operating mode. The system also includes an incoming communication controller that receives an incoming communication from a cellular phone and an output selector that provides an output of the incoming communication controller to a first output device in the first operating mode and to the second output device in the second mode.

11 Claims, 4 Drawing Sheets

HANDOFF FROM PUBLIC TO PRIVATE MODE FOR COMMUNICATIONS

FIELD OF THE INVENTION

The invention relates to automobiles and, more particularly, to controlling the hands-free phone conversations in an automobile.

BACKGROUND

Automobiles, including, cars and trucks, have long included entertainment systems. In particular, automobiles have long included radio tuners, compact disk players, and other means of delivering audio entertainment to passengers. Either a knob or buttons on the steering wheel typically control the volume of entertainment systems.

Cellular phones have become a staple of modern life. Many people have one on their person most or all of the time. However, some states have recently enacted laws prohibiting the use of cellular phone handsets while driving.

One way in which a driver may conduct a cellular phone call while driving is to utilize a headset. The headset may be either directly connected to the cellular phone or via a wireless connection such as, for example, a Bluetooth connection.

In some automobiles, the entertainment system may be coupled to or include a cellular phone. In such automobiles, the phone call may be broadcast over speakers in the automobile and the driver speaks into a microphone located in the automobile. Such systems shall be referred to herein as infotainment systems.

Infotainment systems with the above-identified capabilities may allow for hands-free telephone calls to be made or received. The laws mentioned above typically do not make it illegal for drivers to conduct hands-free telephone calls while driving.

SUMMARY

In an embodiment, an automobile communication system is provided. This embodiment includes an outgoing communication controller that receives a communication from a first input source in a first operating mode and a second input source in a second operating mode. This embodiment also includes an input selector that selects the first input source in the first mode and the second input source in the second mode and a mode selector operable by an automobile passenger that determines the operating mode. This embodiment also includes an incoming communication controller that receives an incoming communication from a cellular phone and an output selector that provides an output of the incoming communication controller to a first output device in the first operating mode and to the second output device in the second mode.

In another embodiment, a method of switching from a handsfree public call to a handsfree private call in an automobile having a personal area network (PAN) is disclosed. The method includes pairing a headset and a handset to the personal area network; allowing a telephone call to begin in a handsfree public mode wherein incoming communications are replayed on an automobile speaker; receiving an indication to change to a handsfree private mode; and continuing the telephone call in a handsfree private mode wherein incoming communications are replayed on the headset.

The above features and advantages, and other features and advantages of the present invention are readily apparent from the following detailed description of the best modes for carrying out the invention when taken in conjunction with the accompanying drawings.

DESCRIPTION OF THE EMBODIMENTS

Figure 1:
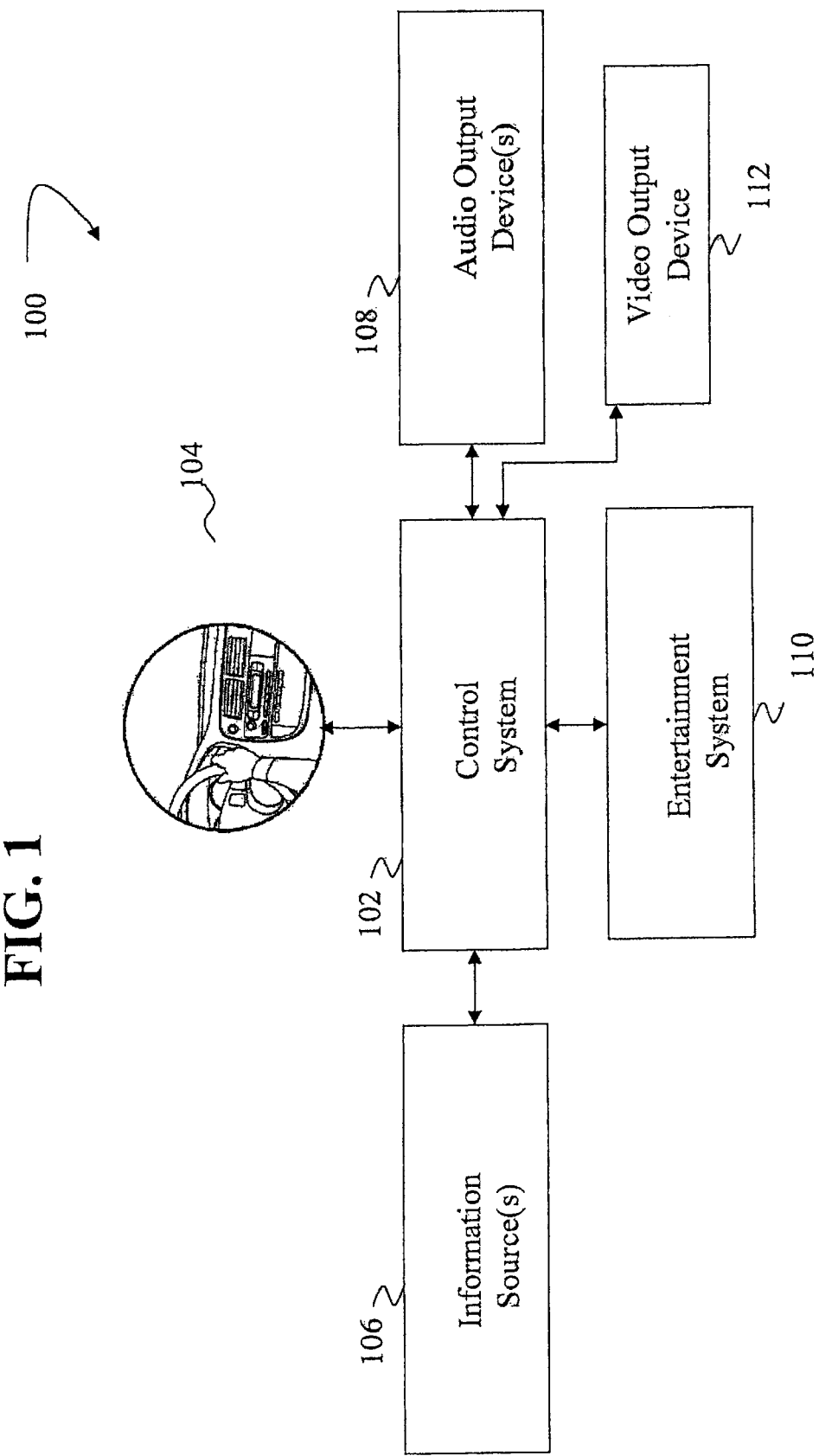
FIG. 1 shows an example of an infotainment system that may be implemented in an automobile.

The following description is merely exemplary in nature and is not intended to limit the present disclosure, application or uses. It should be understood that throughout the drawings, corresponding reference numerals indicate like or corresponding parts and features.

As discussed above, hands free systems allow a user to conduct telephone calls through the automobile's infotainment system. In some cases, the infotainment system utilizes a Bluetooth system to allow for the infotainment system to communicate with the driver's cellular phone. Bluetooth is an open wireless protocol for exchanging data over short distances (using short radio waves) from fixed and mobile devices, creating personal area networks (PANs).

Today's Bluetooth systems only allow a transfer of a hands-free conversation to a private conversation on the cellular phone handset. Such a transfer requires that the user manipulate the handset to effectuate the change. As discussed above, there is increasing legislation banning handset use while driving, which prevents users of current systems from transferring to a private conversation on their handset.

Embodiments of the present invention may allow users to directly transfer a hands-free Bluetooth conversation from the infotainment system to a private Bluetooth headset conversation. In one embodiment, this may be accomplished by allowing a user to pair both a handset and a headset to the Infotainment system and when the user requests the system to "transfer" the call from the audio system to the headset, the Infotainment system bridges the call audio from the handset to the headset. A user pressing a button in the automobile or otherwise indicating that the call is to be transferred could transfer the call, for example.

In accordance with an exemplary embodiment, FIG. 1 schematically illustrates an infotainment system 100 that may be utilized, for example, in an automobile (not shown). While the following discussion is based on implementation in an automobile, the teachings herein may be applied in other contexts. For example, the infotainment system 100 could be utilized on a motorcycle, all-terrain vehicle, or in a home entertainment system.

The infotainment system 100 (also referred to generally herein as "system") may include an infotainment control system 102. The control system 102 receives inputs from various sources and controls access to the audio output device(s) 108.

The control system 102 may receive input signals from an information system 106. The information system 106 may include, but is not limited to, a navigation system, a personal digital assistant (PDA), a radio tuner, a cellular telephone, an Internet connection, a microphone, or any other device capable of providing information to the control system 102.

The control system 102 may also receive input signals from an entertainment system 110. The entertainment system 110 may include, but is not limited to, one or more of a compact disk (CD) player, a radio tuner, a digital video disk (DVD) player, a portable media player, or other now available or later created devices that provide entertainment.

In order for the information or entertainment provided by the information source 106 or entertainment system 110 to be experienced by a passenger, the control system 102 provides the information or entertainment to one or both of the audio input/output 108 or video output 112. The audio input/output 108 may be a system of one or more speakers and may include a microphone for receiving verbal communication from the passengers of the car. The video output 112 may be, for example, one or more display screens located at one or more locations in the automobile.

Typically, a user may control some or all of the infotainment system 100 through a user input device 104. Based on inputs received from the user input device 104, the control system 102 may determine that a user has requested that a conversation be moved from a public to a private conversation.

Figure 2:
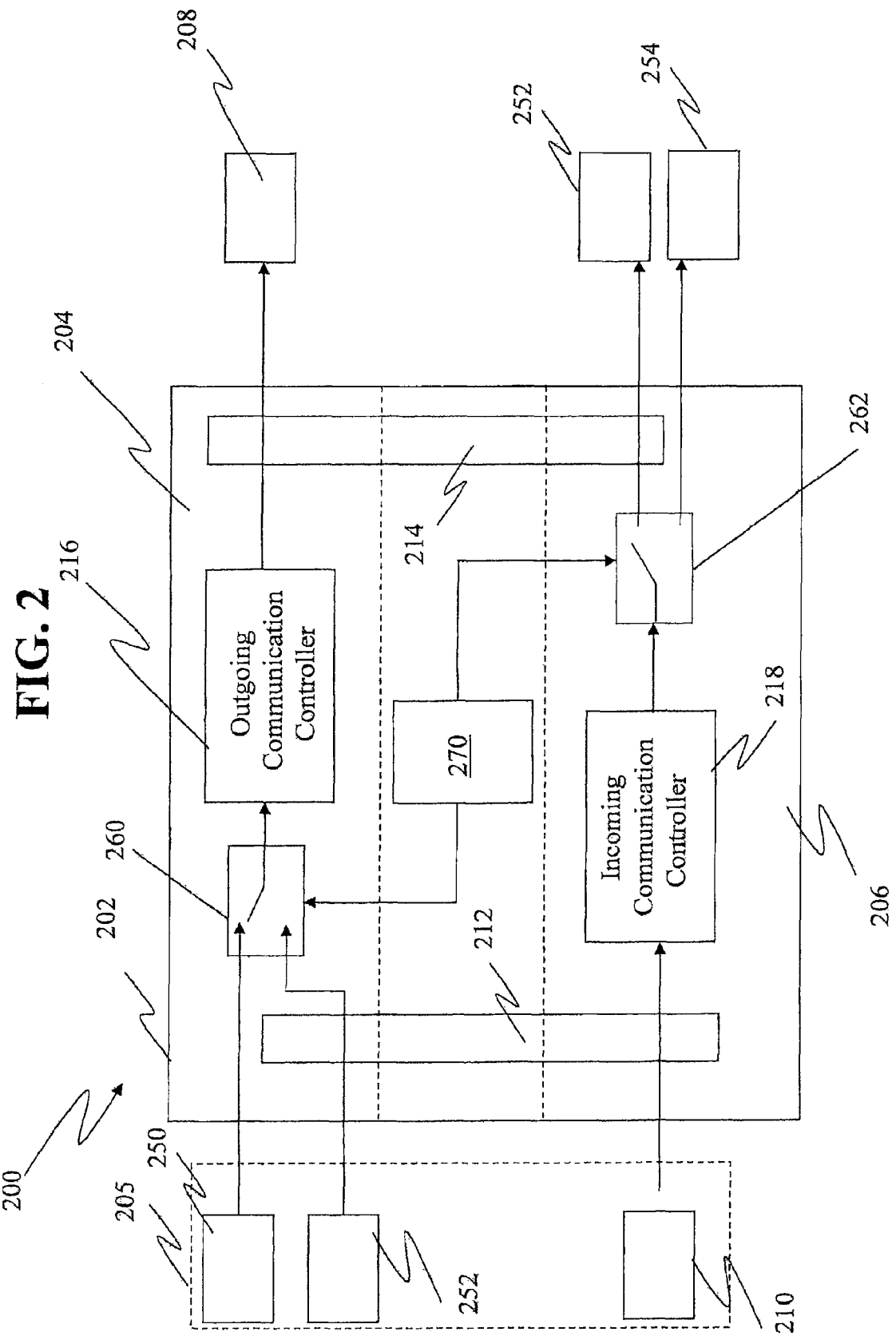
FIG. 2 shows an example of a Bluetooth handoff system according to one embodiment of the present invention.

FIG. 2 shows a more detailed system 200 according to one embodiment to the present invention. The system 200 includes a management module 202. The system may be included, for example, as part of the control system 102 (FIG. 1). Of course, the system 200 could be located in any location in the automobile or could be implemented as a stand-alone unit.

In one embodiment, the management module 202 is a PAN management module. In a particular embodiment, the PAN operates according to the Bluetooth protocol. In such an embodiment, the management module 202 may handle Bluetooth operations in an automobile. The management module 202 of this embodiment may form part of the control system 102 (FIG. 1).

The management module 202 may, in more detail, handle outgoing call information (from a user in the automobile to a user outside the automobile) and incoming call information (from an external user to a user in the automobile). To that end, the management module 202 may include an outgoing communication module 204 and an incoming communication module 206.

The outgoing communication module 204 receives information from information sources 205 within the automobile and provides the information to a PAN output module 208 of a cellular phone. The PAN output module 208 sends the information to the other user over a wireless network. Of course, the cellular phone could include one or more modules between the outgoing call module 204 and the output module 208.

Similarly, the incoming communication module 206 receives information from a PAN input module 210 of a cellular phone. The PAN input module 210 transmits the phone call received by the cellular phone to the management module 202 according to the Bluetooth protocol in one embodiment. Of course, the cellular phone could include one or more modules between the incoming communication module 206 and the input module 210.

It should be understood that the utilization of Bluetooth communications is by way of example only. That is, the PAN could be formed according to other protocols.

The management module 202 may include a PAN receiver 212 and a PAN transmitter 214. The PAN receiver 212 receives RF information in a PAN format from one or more information sources 205. The PAN receiver 212 may also convert the received RF information into an output, such as a digital or analog output. In one embodiment, the PAN is a Bluetooth PAN and the PAN receiver 212 receives RF Bluetooth encoded communications from a Bluetooth enable device and converts them to either analog or digital signals.

As mentioned above, the management module 202 may also include a PAN transmitter 214. The PAN transmitter 214 receives digital or analog communication information, converts it into a PAN format and transmits it. In one embodiment, the PAN transmitter may be a Bluetooth transmitter.

In one embodiment, the PAN receiver 212 and PAN transmitter 214 may be implemented as a single device, for example, as a PAN receiver/transmitter. In one embodiment, the PAN receiver/transmitter is a Bluetooth receiver/transmitter.

The outgoing communication module 204 may include an outgoing communication controller 216. The outgoing communication controller 216 receives either a digital or analog input signal (input signal) and provides it to the PAN transmitter 214 for transmission via a PAN. Similarly, the incoming communication module 206 may contain an incoming communication controller 218 that receives either a digital or analog input signal (depending on how the PAN receiver 212 is configured to operate) and provides it to one of a plurality of information sources.

PAN and Bluetooth PANs in particular, may require that any wireless device be paired with the management module 202. The manner in which devices may be paired is known and not discussed further herein. It is assumed herein that the management module 202 has been paired with at least one cellular phone and one wireless headset. In one embodiment, the cellular phone and wireless headset are capable of pairing with a Bluetooth system. In one embodiment, the wireless headset may operate as both a microphone and a speaker. That is, the headset may be able to both receive input from a user and provide auditory information to the user.

The system 200 (or PAN) may also include particular information sources. In one embodiment the system 200 may include a headset 250 and a microphone 252. In one embodiment, the microphone 252 may be permanently attached to or secured in the automobile. The system 200 may also include one or more auditory output devices. For example, the system 200 may include a headset 250 and speakers 254.

The following description focuses on the operation of the system 200 during the transfer of a call from a handsfree public to a handsfree private conversation. The handsfree public call is created in a typical manner. That is, utilizing a known method or system, a call is placed such that the cell phone is in contact with the management module 202.

In the handsfree public mode, the user speaks and the speech is received by microphone 250. The speech is then provided (in either digital or analog format depending on the type of microphone utilized) to the outgoing communication controller 216 through input selector 260. The input selector 216 determines which of two input signals to provide to the outgoing communication controller 260 based on an operational mode as selected by the mode selector 270. The first (or so-called handsfree public) mode couples the output of the microphone 250 to the outgoing communication controller 216. As shown, the input selector 260 may be any type of selector that selects one signal from two or more input signals and provides the selected input to an output.

The microphone signal is then routed through the outgoing communication controller 216 to the PAN transmitter 214. The PAN transmitter 214 converts, in one embodiment, the signal to the Bluetooth protocol and transmits it to the cell phone paired with the PAN. The cell phone then transmits the communication over a wireless network to another telephone.

As the other user speaks, the communication is provided from the PAN input module 210 to the PAN receiver 212. The PAN receiver 212 provides the communication through the incoming communication controller 218 to the output selector 262. An output selector provides the output to speakers 254 in the first mode.

In the event that the user wishes to covert the handsfree public call to a handsfree private call, the user need only indicate such a desire by pressing or otherwise activating mode selector 270. This causes the user in the automobile to participate in the call over the headset 252 rather than through the microphone 250/speaker 254 combination as in the first mode.

In particular, in the second mode (handsfree private) the input selector 260 selects input from the headset 252 (after being converted by PAN receiver 212) and outputs the audio to the headset 252 rather than the speakers 254. This makes the call private with respect to others in the automobile. This changeover, contrary to the prior art, does not require any manipulation of the handset.

Figure 3:
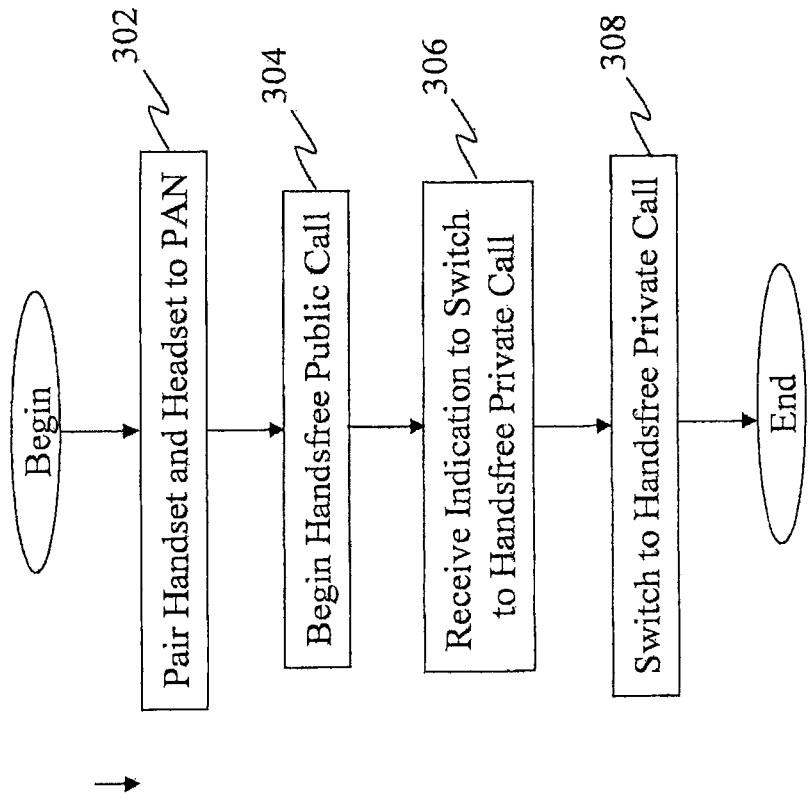
FIG. 3 shows a method according to one embodiment.

FIG. 3 shows a method according to one embodiment of the present invention. The method begins at a block 302 when a handset and headset are paired to the PAN created by management module 202. As discussed above, pairing devices is well known in the art.

At a block 304 a handsfree public call is started. The call may be initiated by either the person in the automobile or from a person outside the automobile calling the person inside the automobile. The handsfree public call broadcasts the incoming communication (from the person outside the automobile) over the speakers of the automobile.

At a block 306 the person inside the car indicates that they wish to convert the call to a handsfree private call. This indication may be made by voice command, physically touching a button or other input device or in any other manner. In one embodiment, such an indication is not made by touching or otherwise manipulating the handset.

At a block 308, the PAN is converted from the first mode (handsfree public) to the second mode (handsfree private). This conversion may include, in one embodiment, changing the selection of an input and an output selection device. In one embodiment, the conversion may include selecting input from a headset rather than a microphone in the car and providing an audio output to the headset rather than the speakers. It shall be understood that a subsequent pressing of a selection button or input device may switch the call back to handsfree public.

Figure 4:
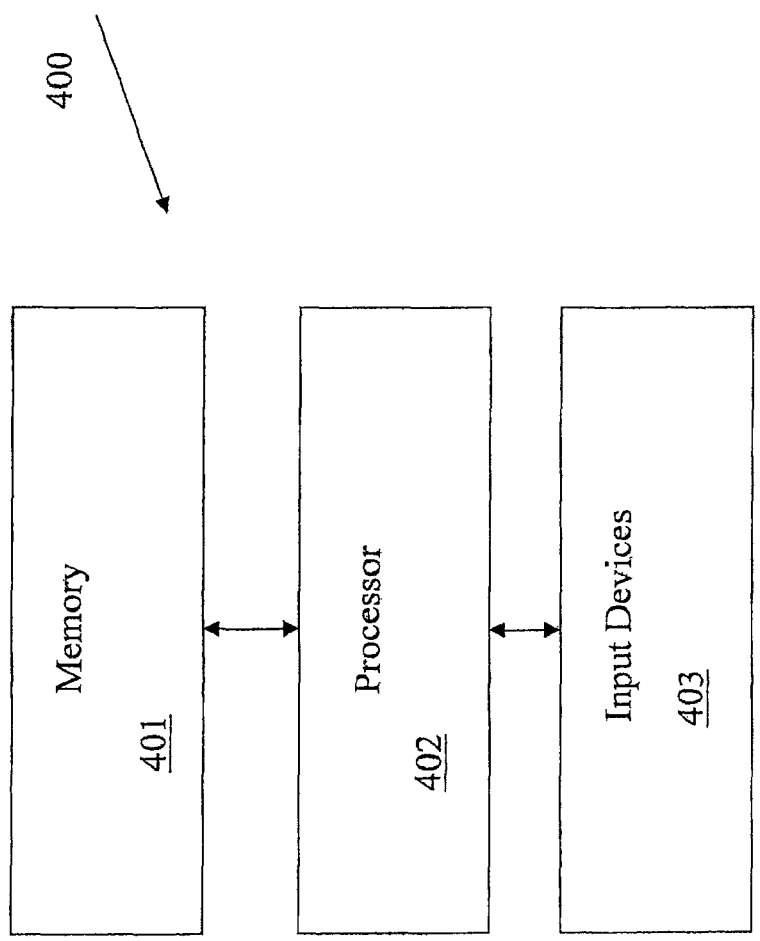
FIG. 4 shows a block diagram of a computing system on which embodiments of the present invention may be implemented.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 4 illustrates a computer system, according to an exemplary embodiment. Therefore, portions or the entirety of the methodologies described herein may be executed as instructions in a processor 402 of the computer system 400. The computer system 400 includes memory 401 for storage of instructions and information, and input device(s) 403 for computer communication. Thus, the present invention may be implemented, in software, for example, as any suitable computer program on a computer system somewhat similar to computer system 400. For example, a program in accordance with the present invention may be a computer program product causing a computer to execute the example methods described herein. In an embodiment, the computer system 400 may form some or all of the infotainment system described above. In an embodiment, the computer system 400 may form some of all of the control system 102 described above.

The computer program product may include a computer-readable medium having computer program logic or code portions embodied thereon for enabling a processor (e.g., 402) of a computer system (e.g., 400) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An automobile communication system in an automobile comprising:
   an outgoing communication controller that receives a communication from a cellular telephone in a first operating mode and a microphone separate from the cellular telephone in a second operating mode;
   an input selector that selects the cellular telephone in the first operating mode and the microphone in the second operating mode;
   a mode selector operable by an automobile passenger that receives an indication from the automobile passenger during a cellular telephone call indicating a change from the second operating mode to the first operating mode is desired;
   an incoming communication controller that receives an incoming communication from the cellular telephone; and
   a button in the car causes an output of the incoming communication controller to the cellular telephone in the first operating mode and to a speaker in the automobile in the second mode.

2. The system of claim 1, further comprising:
   a personal area network (PAN) receiver coupled between the microphone and the outgoing communication controller and between the cellular telephone and the incoming communication controller.

3. The system of claim 2, further comprising:
a PAN transmitter coupled between the outgoing communication controller and the cellular telephone and between the incoming communication controller and the second input source.

4. The system of claim 3, further comprising:
the cellular telephone.

5. The system of claim 3, wherein the PAN transmitter is a Bluetooth transmitter and the PAN receiver is a Bluetooth receiver.

6. A method of switching from a handsfree public call to a handsfree private call in an automobile having a personal area network (PAN), the method comprising:
pairing a headset and a handset to the personal area network;
allowing a telephone call to begin in a handsfree public mode wherein incoming communications are replayed on an automobile speaker;
receiving an indication from a passenger in the automobile to change to a handsfree private mode during the telephone call without manipulating the headset; and
continuing the telephone call in a handsfree private mode wherein incoming communications are replayed on the headset.

7. The method of claim 6, wherein the personal area network is formed by a management module that includes a PAN receiver and a PAN transmitter.

8. The method of claim 6, wherein continuing includes receiving outgoing communications from the headset.

9. The method of claim 6, wherein allowing includes receiving outgoing communications from a microphone located in the automobile.

10. The method of claim 6, wherein receiving does not include receiving any indication that a user manipulated the handset.

11. The method of claim 6, further comprising:
re-allowing, after continuing, the telephone call to continue in the handsfree public mode wherein incoming communications are replayed on an automobile speaker.

* * * * *